Sept. 8, 1925. 1,552,407
Z. ALMESAN
SHOCK ABSORBER
Filed Feb. 7, 1924
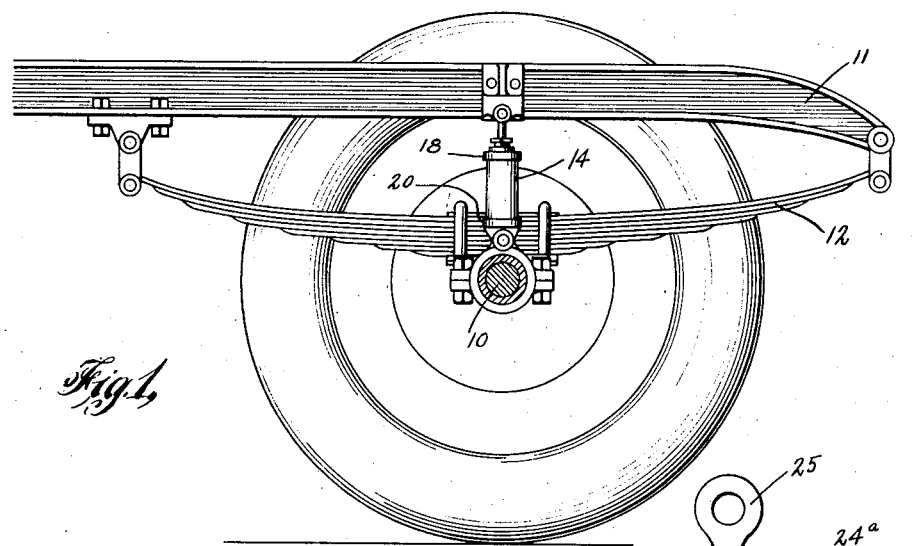
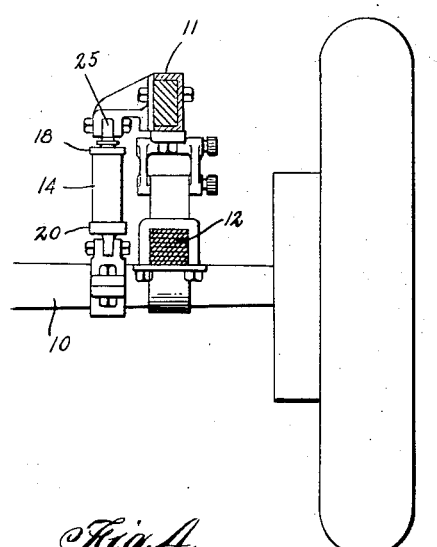
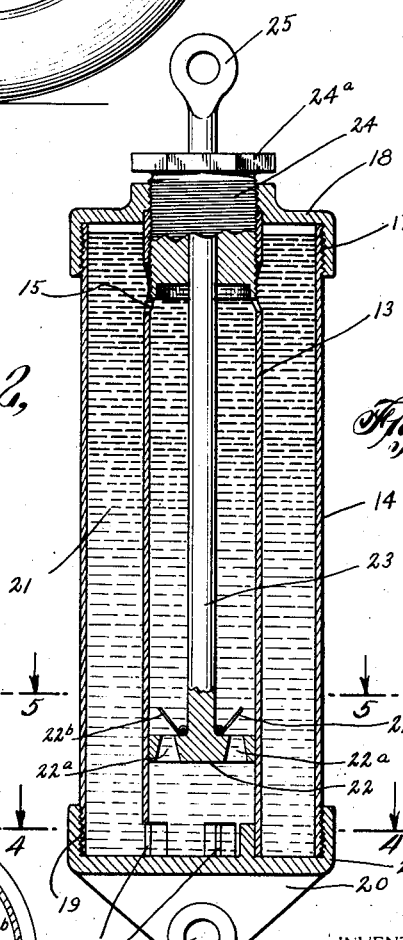
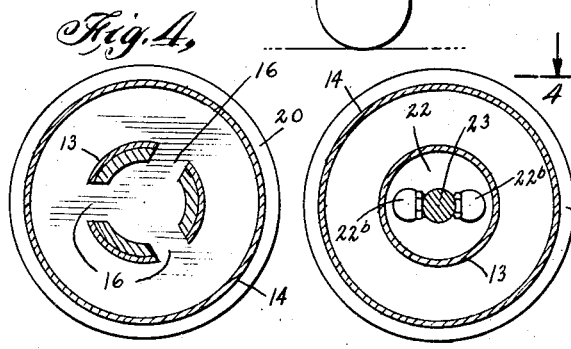
INVENTOR
ZARIE ALMESAN
BY
ATTORNEY Patented Sept. 8, 1925.

1,552,407

UNITED STATES PATENT OFFICE.

ZARIH ALMESAN, OF NEW YORK, N. Y., ASSIGNOR OF ONE-HALF TO MAX ROTH, OF NEW YORK, N. Y.

SHOCK ABSORBER.

Application filed February 7, 1924. Serial No. 691,107.

*To all whom it may concern:*

Be it known that ZARIH ALMESAN, citizen of the United States, residing at New York city, in the county of Bronx and State of New York, has invented certain new and useful Improvements in Shock Absorbers, of which the following is a specification.

This invention relates to shock absorbers for motor vehicles.

The object of the invention is to provide a practical device of the character described which shall be efficient in operation to a high degree, simple in construction, and comparatively cheap to manufacture.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention.

Fig. 1 is a side elevational view showing one wheel and axle and the springs of a motor vehicle with a shock absorber embodying this invention secured in position on the axle;

Fig. 2 is a corresponding end elevational view;

Fig. 3 is a longitudinal cross-sectional view of a shock absorber embodying this invention;

Fig. 4 is a detailed cross-sectional view taken along line 4—4 of Fig. 3; and

Fig. 5 is a detailed cross-sectional view taken along line 5—5 of Fig. 3.

Referring in detail to the drawing, 10 indicates the rear axle of a motor vehicle, 11, one of the side bars thereof, and 12 a leaf spring secured to the rear axle and said side bar in any suitable manner. The shock absorber is secured at one end to the side bar and at the other end to the rear axle in any suitable manner, such as hereinafter described, and comprises a pair of concentric cylinders 13, 14, the inner cylinder communicating with the outer cylinder at the top and bottom by means of openings 15 and 16 respectively. The outer cylinder is threaded at the top as at 17 for the screw cap member 18 and is likewise threaded at the bottom as at 19 for the hanger or attaching member 20. The cylinders are filled with a suitable liquid 21, such as oil, and operating within the inner cylinder 13 is a piston 22 carried by the plunger or pitman 23. The inner tube is threaded as at 13$^a$ for the screw regulating cap 24, and the plunger 23 extends through said regulating cap 24, the latter being bored centrally so as to permit free movement of the plunger. The regulating screw 24 may be adjusted so as to contral the quantity of oil that is forced through the orifices 15, thus making it possible to adjust the device to various spring tensions. Secured to the top of the plunger or formed integrally therewith is a ring member 25 whereby the plunger may be attached to the side bar or chassis of the vehicle. In the piston 22 are provided valve openings 22$^a$ adapted to be opened and closed by means of hinged valves 22$^b$ or in other suitable valve members. A screw member 24 is provided with a polygonal head 24$^a$ and is adapted to be screwed in and out of the inner tube so as to regulate the size of the openings 15.

I preferably attach the shock absorber to the vehicle in the following manner: The plunger 23 is connected to the chassis or body by means of the ring member 25, and a bracket or yoke 26 extending from the side bar, and a pin or bolt 27 so as to provide a swivel connection, said bracket being preferably off-set from the spring as is best seen in Fig. 2. The lower portion of the shock absorber is attached to the rear axle by means of the hanger 20 having a screw cap portion 20$^a$ which serves as a closure for the two cylinders being screwed to the bottom of the outer cylinder 14, and provides a journal member 20$^b$ for the axle.

The operation of the shock absorber is as follows: When the spring of the vehicle contracts, the plunger will move downward, thus forcing open the valves 22$^b$ and causing some of the oil in the inner cylinder to be forced above the piston and through the opening 15 into the outer cylinder. The oil in the inner cylinder below the piston will at the same time flow through the openings 16 into the outer cylinder, causing a flow of the oil in opposite directions from the inner into the outer cylinder. Upon the expansion of the spring, the plunger 23 will be drawn upward thus closing immediately the valves 22ᵇ thereof forcing the oil in the back of the piston to flow through the openings 15 into the outer tube, and from the outer tube through the openings 16 into the inner tube.

It will be seen that there is a flow or circulation of oil between the outer and inner cylinders during the downward and upward movement of the chassis which corresponds to the contraction and expansion of the vehicle spring. This circulation or flow acts as an efficient and responsive cushion to take up almost instantaneously the shock immediately it is transmitted to the spring.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A shock absorber for auto vehicles comprising an outer cylinder and an inner cylinder, the latter including a plurality of openings spaced adjacent the top thereof communicating with the outer cylinders, and means supported by the inner cylinder for regulating the size of said openings.

2. A shock absorber for auto vehicles comprising an outer cylinder and an inner cylinder, the latter having openings adjacent the top thereof and openings adjacent the bottom thereof communicating with the outer cylinder, and means for regulating the size of said first mentioned openings, said means comprising a threaded cap operative within the upper portion of the inner cylinder.

In testimony whereof I affix my signature.

ZARIE ALMESAN.